US012632138B2

(12) United States Patent
Han et al.

(10) Patent No.: US 12,632,138 B2
(45) Date of Patent: May 19, 2026

(54) DISPLAY DEVICE

(71) Applicant: Samsung Display Co., LTD., Yongin-si (KR)

(72) Inventors: Jong-heon Han, Yongin-si (KR);
Jinseuk Kim, Yongin-si (KR)

(73) Assignee: SAMSUNG DISPLAY CO., LTD.,
Gyeonggi-do (KR)

( * ) Notice: Subject to any disclaimer, the term of this patent is extended or adjusted under 35 U.S.C. 154(b) by 0 days.

(21) Appl. No.: 19/007,986

(22) Filed: Jan. 2, 2025

(65) Prior Publication Data

US 2025/0355521 A1     Nov. 20, 2025

(30) Foreign Application Priority Data

May 17, 2024     (KR) ........................ 10-2024-0064747

(51) Int. Cl.
G06F 3/041          (2006.01)
G06F 3/044          (2006.01)
(52) U.S. Cl.
CPC ........ G06F 3/04164 (2019.05); G06F 3/0446 (2019.05)
(58) Field of Classification Search
CPC ........................... G06F 3/04164; G06F 3/0446
USPC ....................................................... 345/204
See application file for complete search history.

(56) References Cited

U.S. PATENT DOCUMENTS

2018/0308903 A1 * 10/2018 Jeong ................. H10K 59/8791
2023/0066243 A1 *  3/2023 Li ........................... G06F 3/041

FOREIGN PATENT DOCUMENTS

CN      116113285 A  *  5/2023 ........... G06F 3/0412
JP       3721916 B2  * 11/2005
KR      101862048 B1     5/2018
KR      101908501 B1    10/2018
KR     1020200101153 A    8/2020
KR     1020210059531 A    5/2021
KR      102448543 B1  *  9/2022 ........... G09G 3/3225

* cited by examiner

*Primary Examiner* — Mark Edwards
(74) *Attorney, Agent, or Firm* — CANTOR COLBURN LLP

(57)          ABSTRACT
A display device includes a display panel including a display area and a peripheral area defined around the display area, a touch sensor including a touch sensing electrode disposed on the display panel and overlapping the display area of the display panel, a plurality of panel pads disposed on the peripheral area of the display panel, a plurality of dummy panel pads disposed on the peripheral area of the display panel and spaced apart from the plurality of panel pads, a driving circuit chip disposed between the display area and the plurality of panel pads, and between the display area and the plurality of dummy panel pads, and a touch connection wire connected to the touch sensing electrode and the driving circuit chip, where the touch connection wire is disposed between the plurality of dummy panel pads in a plan view.

20 Claims, 14 Drawing Sheets

DISPLAY DEVICE

This application claims priority to Korean Patent Application No. 10-2024-0064747, filed on May 17, 2024, and all the benefits accruing therefrom under 35 U.S.C. § 119, the content of which in its entirety is herein incorporated by reference.

BACKGROUND

1. Field

Embodiments of the disclosure relate to a display device.

2. Description of the Related Art

A display device is a device that displays a screen and includes a liquid crystal display (LCD) and an organic light emitting diode (OLED). These display devices are used in various electronic devices such as mobile phones, navigation devices, digital cameras, electronic books, portable game consoles, and various terminals.

As an input device for such electronic devices, a touch sensor is used, which allows the user to input information by touching the screen with a finger or a pen. Among the various sensing methods of touch sensors, the capacitive type, which detects the location where the capacitance change occurs due to contact between two electrodes spaced apart from each other, is mainly used.

SUMMARY

A touch sensor of an electronic device may include a plurality of wires, and the plurality of wires may be connected to a test pad for testing the characteristics of the touch sensor. In such an electronic device, it may be important to secure an alignment margin between the plurality of wires connected to the test pad and adjacent components of the electronic device to prevent a short circuit, etc. from occurring between the plurality of wires connected to the test pad and the adjacent components.

Embodiments are directed to a display device including a driving chip that drives the display panel and drives the touch sensor together, in which a short is effectively prevented from occurring between the touch signal wire of the touch sensor and the pad on the printed circuit board.

The display device according to an embodiment includes a display panel including a display area and a peripheral area defined around the display area, a touch sensor including a touch sensing electrode disposed on the display panel and overlapping the display area of the display panel, a plurality of panel pads disposed on the peripheral area of the display panel, a plurality of dummy panel pads disposed on the peripheral area of the display panel and spaced apart from the plurality of panel pads, a driving circuit chip disposed between the display area and the plurality of panel pads, and between the display area and the plurality of dummy panel pads, and a touch connection wire connected to the touch sensing electrode and the driving circuit chip, where the touch connection wire is disposed between the plurality of dummy panel pads in a plan view.

In an embodiment, the touch connection wire may be provided in plural, and a plurality of touch connection wires may be disposed between adjacent dummy panel pads among the plurality of dummy panel pads.

In an embodiment, a width of the plurality of panel pads may be greater than a width of the plurality of dummy panel pads.

In an embodiment, a distance between adjacent panel pads among the plurality of panel pads may be smaller than a distance between adjacent dummy panel pads among the plurality of dummy panel pads.

In an embodiment, the plurality of panel pads and the plurality of dummy panel pads may be arranged in a row to be adjacent to the driving circuit chip.

In an embodiment, one end of the touch connection wire may be connected to the touch sensing electrode, and an opposing end of the touch connection wire may be substantially aligned with a same boundary as an end of the display panel adjacent to the plurality of panel pads and the plurality of dummy panel pads in the plan view.

In an embodiment, the touch connection wire may overlap the driving circuit chip in the plan view.

In an embodiment, the plurality of dummy panel pads may be floating.

According to an embodiment, the display device includes a display panel including a display area and a peripheral area defined around the display area, a touch sensor including touch sensor electrodes overlapping the display area of the display panel, a plurality of panel pads disposed on the peripheral area of the display panel, a plurality of dummy panel pads spaced apart from the plurality of panel pads, a driving circuit chip disposed between the display area and the plurality of panel pads, and between the display area and the plurality of dummy panel pads, touch connection wires connected to the touch sensing electrodes and the driving circuit chip, a printed circuit board overlapping the plurality of panel pads and the plurality of dummy panel pads, a plurality of circuit pads disposed on the printed circuit board facing the plurality of panel pads, and plurality of dummy circuit pads disposed on the printed circuit pads disposed on the printed circuit board facing the plurality of panel pads, and plurality of dummy circuit pads disposed on the printed circuit board facing the plurality of dummy panel pads, where the touch connection wire is located among the plurality of dummy panel pads in a plan view.

In an embodiment, a width of the plurality of dummy panel pads may be greater than a width of the plurality of dummy circuit pads.

In an embodiment, the touch connection wire may be provided in plural, and a plurality of touch connection wires may be disposed between adjacent dummy panel pads among the plurality of dummy panel pads.

In an embodiment, the plurality of dummy circuit pads may overlap a part of a dummy panel of the plurality of dummy panel pads in the plan view.

In an embodiment, the plurality of dummy circuit pads may overlap one of the plurality of touch connection wires disposed between adjacent dummy panel pads among the plurality of dummy panel pads.

In an embodiment, a width of the plurality of circuit pads may be greater than a width of the plurality of dummy circuit pads.

In an embodiment, a width of the plurality of panel pads may be greater than a width of the plurality of dummy panel pads.

In an embodiment, a distance between adjacent circuit pads among the plurality of circuit pads may be smaller than a distance between adjacent dummy circuit pads among the plurality of dummy circuit pads.

In an embodiment, a distance between adjacent panel pads among the plurality of panel pads may be smaller than a distance between adjacent dummy panel pads among the plurality of dummy panel pads.

In an embodiment, a ratio between a width of each of the plurality of dummy circuit pads and a distance between adjacent dummy circuit pads among the plurality of adjacent dummy circuit pads may be in a range of about 1:1 to 1:1.5.

In an embodiment, the plurality of dummy panel pads and the plurality of dummy circuit pads may be floating.

The display device according to an embodiment may further include a conductive ball disposed between the plurality of panel pads and the plurality of circuit pads and between the plurality of dummy panel pads and the plurality of dummy circuit pads.

According to embodiments, dummy pads are placed on both opposing sides of the touch signal wire extending to the pad area of the display panel to which the printed circuit board is attached to test the characteristics of the touch sensor, thereby effectively preventing a short between the pad on the pad of the printed circuit board and the touch signal wire from occurring.

DETAILED DESCRIPTION

Figure 1:
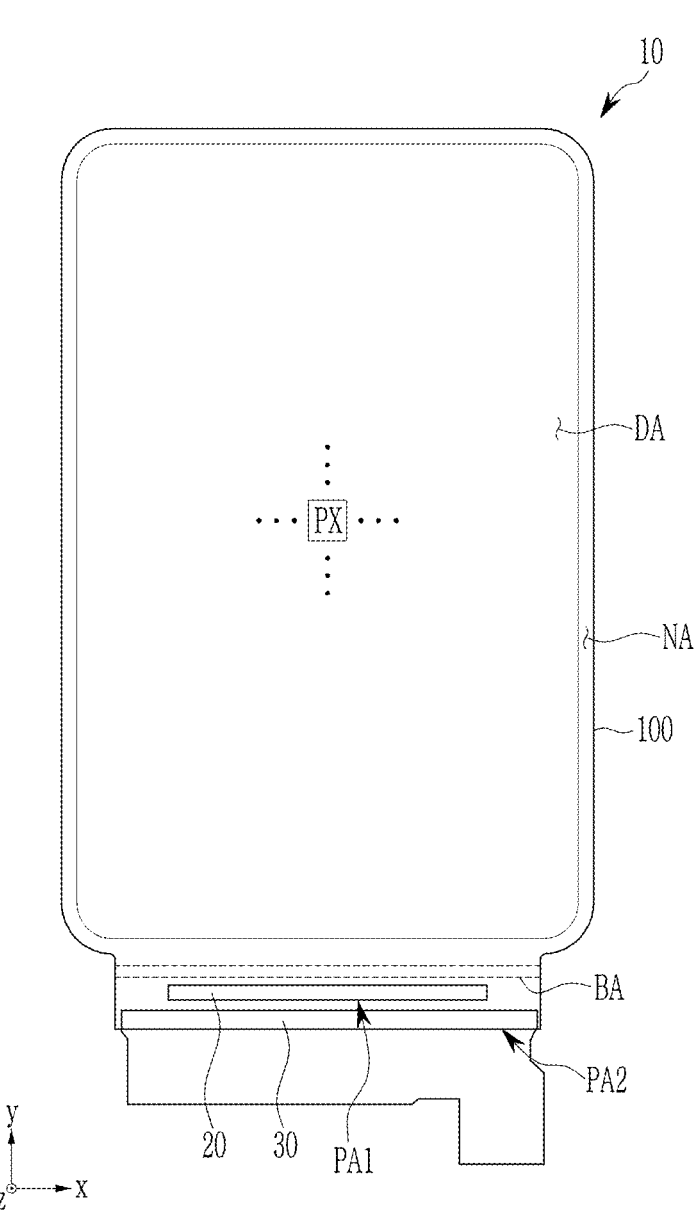
FIG. 1 is a plan view showing a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

In addition, the size and thickness of each component shown in the drawings are arbitrarily shown for convenience of illustration, so the disclosure is not necessarily limited to that which is shown. In the drawings, the thickness is enlarged to clearly express various layers and areas. Also, in the drawings, for convenience of illustration, the thicknesses of some layers and regions are exaggerated.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

In addition, throughout the specification, when reference is made to "in a plan view," this means when the target part is viewed from above, and when reference is made to "in a cross-section," this means when a cross-section of the target part is cut vertically and viewed from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, a display device according to an embodiment will be described with reference to FIGS. 1 to 7.

Figure 2:
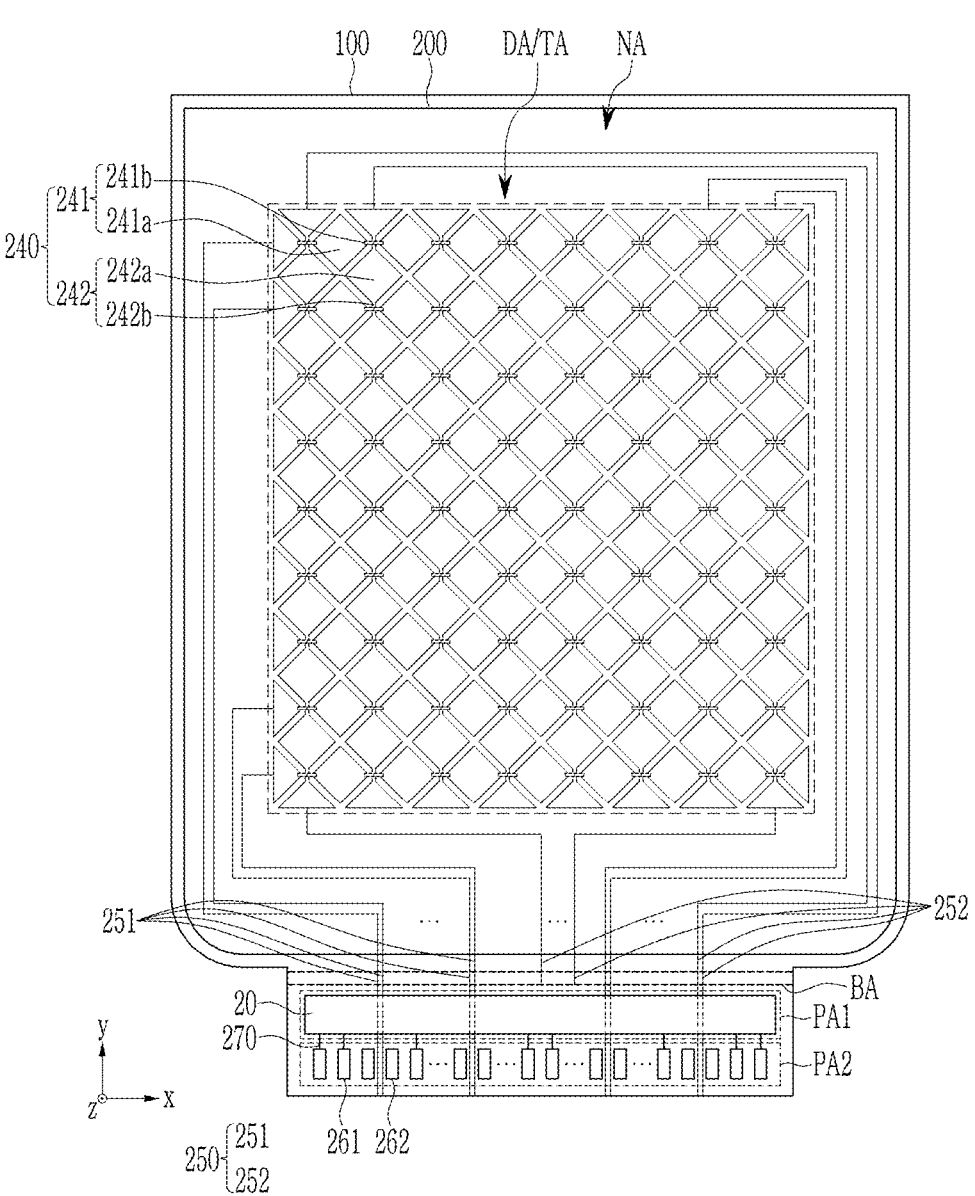
FIG. 2 is a plan view showing a display panel and a touch sensor of a display device according to an embodiment.
Figure 3:
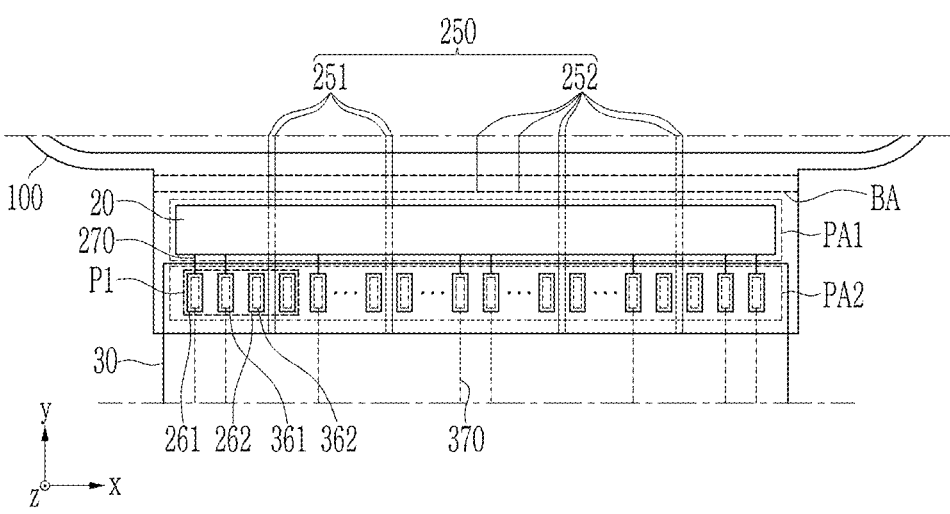
FIG. 3 is a partial enlarged view showing part of a display device according to an embodiment.
Figure 4:
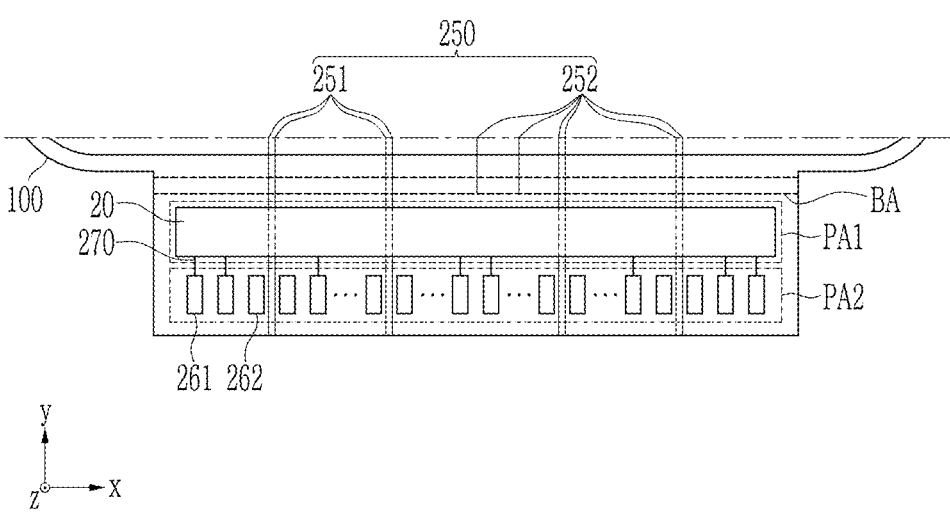
FIG. 4 is a partial enlarged view showing part of a display panel according to an embodiment.
Figure 5:
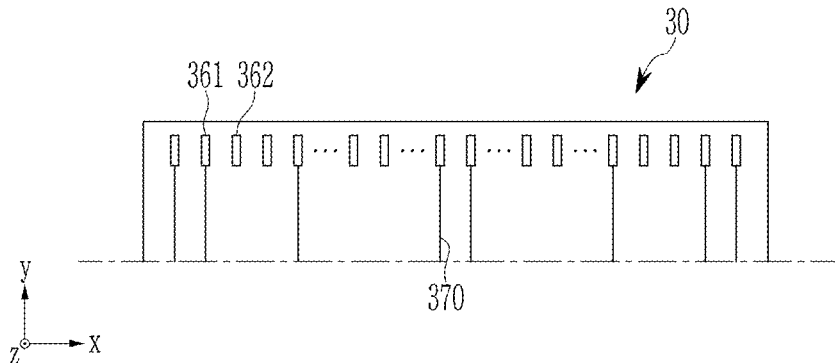
FIG. 5 is a partial enlarged view showing part of a printed circuit board according to an embodiment.
Figure 6:
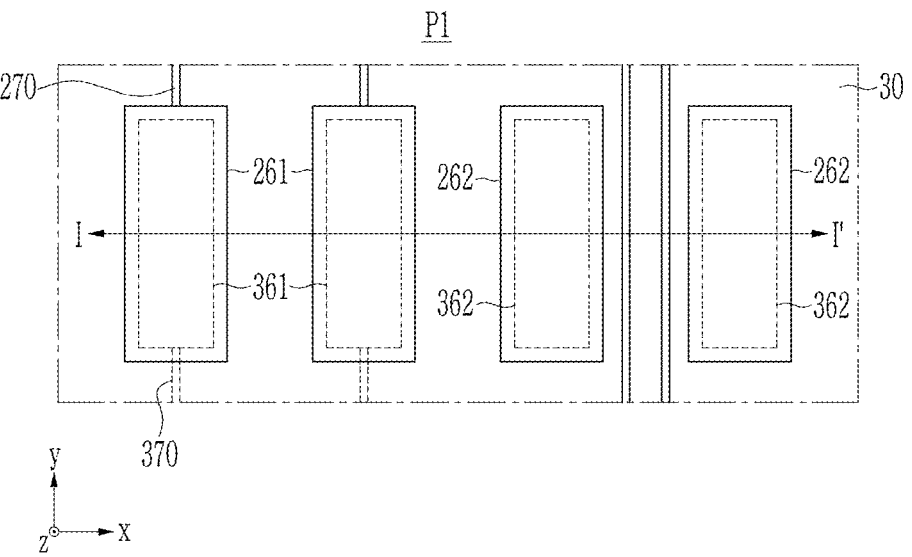
FIG. 6 is an enlarged plan view of area P1 in FIG. 3.
Figure 7:
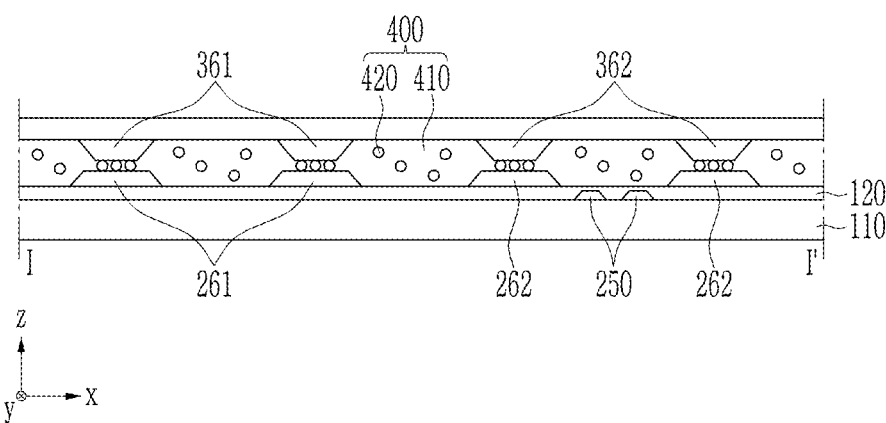
FIG. 7 is a cross-sectional view taken along line I-I' of FIG. 6.

FIG. 1 is a plan view showing a display device according to an embodiment. FIG. 2 is a plan view showing a display panel and a touch sensor of a display device according to an embodiment. FIG. 3 is a partial enlarged view showing part of a display device according to an embodiment. FIG. 4 is a partial enlarged view showing a part of a display panel according to an embodiment. FIG. 5 is a partial enlarged view showing a part of a printed circuit board according to an embodiment. FIG. 6 is an enlarged plan view of area P1 in FIG. 3. FIG. 7 is a cross-sectional view taken along line I-I' of FIG. 6.

Referring to FIGS. 1 to 7, the display device 10 according to an embodiment may include a display panel 100, a driving circuit chip 20, a printed circuit board 30, and a touch sensor 200.

The display panel 100 includes a display area DA corresponding to a screen on which an image is displayed, and a peripheral area NA. In an embodiment, as shown in FIG. 1, the peripheral area NA may surround the display area DA. However, this is an example, and the arrangement relationship between the display area DA and the surrounding area NA may be changed in various ways.

The display panel 100 includes or is made of a flexible material and can be changed into various shapes. The display panel 100 may be flexible, stretchable, foldable, bendable, or rollable. The display panel 100 may be bent at the boundary between the display area DA and the peripheral area NA. The peripheral area NA may be bent from the display area DA so that a portion of the peripheral area NA is located behind the display area DA. However, this is an example, and the location of the surrounding area NA may be changed in various ways.

The display area DA of the display panel 100 may be approximately rectangular including long and short sides, and the corners may be chamfered to have a curved shape. However, this shape of the display area DA is an example and may be changed to various shapes. A plurality of pixels PX are located in most of the display area DA to display an image. Some areas at the edges of the display area DA may have areas where no pixels PX are located and therefore do not display the screen.

The plurality of pixels PX may be located in a matrix form in the display area DA of the display panel 100. Signal lines such as a gate line, a data line, a driving voltage line, and an initializing voltage line may be disposed in the display area DA.

The gate line may extend in a first direction X, and the data line and the driving voltage line may extend in a second direction Y crossing the first direction X. The initialization voltage line may include a voltage line extending in the first direction X and a voltage line extending in the second direction Y, and may be arranged in a mesh shape. Here, a third direction Z may be a direction perpendicular to a plane defined by the first direction X and the second direction, or a thickness direction of the display panel 100.

Each of the plurality of pixels PX is connected to a gate line, a data line, a driving voltage line, an initialization voltage line, etc., and can receive a gate signal, a data voltage, a driving voltage, an initialization voltage, etc. from these signal lines. Each of the plurality of pixels PX may also receive a common voltage. The plurality of pixels PX may be implemented as a light emitting element such as a light emitting diode.

A driving unit that generates and/or processes various signals for driving the display panel 100 may be located in the peripheral area NA of the display panel 100. The driving device includes a data driver that applies a data voltage to the data lines, a gate driver that applies a gate signal to the gate lines, and a signal controller that controls the data driver and the gate driver. A plurality of pixels PX may receive a data voltage at a predetermined timing in response to a gate signal generated by the gate driver.

The gate driver may be integrated into the display panel 100 and may be located on at least one side of the display area DA. The data driver and signal controller may be provided as a driving circuit chip 20.

According to an embodiment, the surrounding area NA may include a first pad area PA1 and a second pad area PA2 where pads for input and output of a plurality of signals are arranged.

The first pad area PA1 and the second pad area PA2 may be spaced apart in the second direction Y. The first pad area PA1 may be located closer to the display area DA than the second pad area PA2. In an embodiment, for example, the second pad area PA2 may be located adjacent to the lower edge of the peripheral area NA of the display panel 100.

The display panel 100 according to an embodiment may further include a bending area BA located between the display area DA and the first pad area PA1. The bending area BA may extend in the first direction X between the display area DA and the first pad area PA1 and may have a predetermined width along the second direction Y.

The display panel 100 may be bent to a predetermined radius of curvature based on a bending axis parallel to the first direction X in the bending area BA. In an embodiment where the display panel 100 is of the front emission type (top emission type), the first and second pad areas PA1, PA2, which are farther from the display area DA than the bending area BA, may be bent in a way such that they are located on the back side of the display area DA. However, the embodiment is not limited to this, and the bending area BA may be located in the display area DA or may be located across the display area DA and the peripheral area NA.

The driving circuit chip 20 may be located in the peripheral area NA of the display panel 100. The driving circuit chip 20 may be bonded to the first pad area PA1. The driving circuit chip 20 may include an integrated circuit that drives the display panel 100.

The driving circuit chip 20 may be attached to the display panel 100 through an anisotropic conductive film or may be attached to the display panel 100 through ultrasonic bonding. The driving circuit chip 20 may be a chip on plastic (COP), but the embodiment is not limited thereto.

The driving circuit chip 20 may be an integrated driving circuit chip 20 that applies a driving signal to the touch unit while applying a display driving signal. In an embodiment, for example, the driving circuit chip 20 may be a driver integrated circuit that integrates a display driver integrated circuit and a touch driver integrated circuit.

A plurality of display signal wire pads and touch signal wire pads may be located in the first pad area PA1 of the display panel 100. In an embodiment where the driving circuit chip 20 generates the drive signal and the drive signal of the touch unit together, the plurality of display signal wiring and the touch signal wiring are electrically connected with the driving circuit chip 20, and a plurality of bumps on the driving circuit chip 20 may be electrically connected with the plurality of display signal wiring pads and the touch signal wiring pads.

According to an embodiment, the display panel 100 may include a plurality of panel pads 261 located in the second pad area PA2, a plurality of dummy panel pads 262, and signal connection wiring 270 connected to the plurality of panel pads 261.

In an embodiment, as shown in FIG. 2, each of the plurality of panel pads 261 may be connected to the signal connection wiring 270, and the plurality of dummy panel pads 262 may not be connected to the signal connection wiring 270. That is, the plurality of dummy panel pads 262 may be electrically floating. In other words, as the plurality of dummy panel pads 262 are electrically floating, no voltage or signal may be applied thereto.

The signal connection wiring 270 connected to the plurality of panel pads 261 may extend to the first pad area PA1 of the display panel 100 and be connected to the driving circuit chip 20. That is, the plurality of panel pads 261 may be electrically connected to the driving circuit chip 20 through signal connection wiring 270.

Although not specified, some of the signal connection wiring 270 connected to a plurality of panel pads 261 extend into the peripheral area NA of the display panel 100, to be connected to driving devices such as a data driver, gate driver, and signal controller located in the peripheral area NA.

The plurality of panel pads 261 and the plurality of dummy panel pads 262 are aligned along the first direction X adjacent to the driving circuit chip 20 in the second pad area (PA2) of the display panel 100. However, this is an example, and each of the plurality of panel pads 261 and the plurality of dummy panel pads 262 may be arranged to form a row along a different first direction X.

The number of panel pads 261 and the number of dummy panel pads 262 may be different. In an embodiment, for example, the number of panel pads 261 may be greater than the number of dummy panel pads 262. However, the embodiment is not limited to this, and the number of the plurality of panel pads 261 and the plurality of dummy panel pads 262 may be changed in various ways.

A plurality of dummy panel pads 262 may be located between the plurality of panel pads 261. The plurality of dummy panel pads 262 may be located adjacent to each other. In an embodiment, at least two or more dummy panel pads 262 may be consecutively arranged between the plurality of panel pads 261. However, the arrangement of the panel pads 261 and the dummy panel pads 262 is not limited to this and may be changed in various ways. In another embodiment, for example, the plurality of dummy panel pads 262 may be continuously arranged at one edge and/or another edge of the second pad area PA2 of the display panel 100. In such an embodiment, the plurality of dummy panel pads 262 may be arranged on an outermost edge of one side and/or another side of the second pad area PA2.

In an embodiment, the width of the panel pad 261 located in the second pad area PA2 of the display panel 100 along the first direction X and the width of the dummy panel pad 262 along the first direction X may be substantially the same as each other.

Here, the width of the panel pad 261 and the dummy panel pad 262 in the first direction X may refer to the maximum width of the panel pad 261 and the dummy panel pad 262, respectively.

In an embodiment, the distance between adjacent panel pads 261 may be substantially the same as the distance between adjacent dummy panel pads 262.

Here, the distance between adjacent panel pads 261 and the distance between adjacent dummy panel pads 262 may refer to the distance along the first direction X between sides facing each other on a plane. However, the width of the panel pad 261 and the dummy panel pad 262 and the distance between them may be changed in various ways, and a detailed description thereof will be made with reference to FIGS. 9 to 14.

In an embodiment, as shown in FIG. 3, the printed circuit board 30 may be located in the peripheral area NA of the display panel 100. The printed circuit board 30 may be bonded to the second pad area PA2.

The printed circuit board 30 may be a flexible printed circuit (FPC) board or a film. In an embodiment, the printed circuit board 30 may be an integrated printed circuit board 30 that drives both the display and the touch unit. In such an embodiment, the printed circuit board 30 can output signals and power for controlling the driving circuit chip 20.

However, the embodiment is not limited thereto, and a display driving substrate and a touch unit driving substrate may each be attached to the display panel 100.

In an embodiment, as shown in FIG. 5, the printed circuit board 30 may include a plurality of circuit pads 361 located on one surface facing the second pad area PA2 of the display panel 100, a plurality of dummy circuit pads 362, and a plurality of circuit connection wiring 370 connected to the plurality of circuit pads 361.

The plurality of circuit pads 361 face the plurality of panel pads 261 located in the second pad area PA2 of the display panel 100, and the plurality of dummy circuit pads 362 can be arranged to face the plurality of dummy panel pads 262. That is, each of the plurality of circuit pads 361 overlaps and is electrically connected to the plurality of panel pads 261, and each of the plurality of dummy circuit pads 362 overlaps the plurality of dummy panel pads 262.

In such an embodiment, as shown in FIG. 6, the arrangement relationship between the plurality of circuit pads 361 and the plurality of dummy circuit pads 362 may be substantially the same as the arrangement relationship between the plurality of panel pads 261 and the plurality of dummy panel pads 262 described above.

Each of the plurality of circuit pads 361 may be connected to the circuit connection wiring 370, and the plurality of dummy circuit pads 362 may not be connected to the circuit connection wiring 370. In an embodiment, the plurality of dummy circuit pads 362 may be electrically floating like the dummy panel pad 262 described above. In such an embodiment, as the plurality of dummy circuit pads 362 are electrically floating, no voltage or signal may be applied thereto.

The width of the circuit pad 361 of the printed circuit board 30 along the first direction X and the width of the dummy circuit pad 362 along the first direction X may be substantially the same as each other.

The width of the circuit pad 361 along the first direction X is smaller than the width of the panel pad 261 along the first direction X, and the width of the dummy circuit pad 362 along the first direction X may be smaller than the width of the dummy panel pad 262 in the first direction X.

Here, the width of the circuit pad 361 and the dummy circuit pad 362 may refer to the maximum width of the circuit pad 361 and the dummy circuit pad 362, respectively.

The distance between adjacent circuit pads 361 may be substantially equal to the distance between adjacent dummy circuit pads 362.

Here, the distance between adjacent circuit pads 361 and the distance between adjacent dummy circuit pads 362 may refer to the distance along the first direction X between sides facing each other on a plane. However, the width of the circuit pad 361 and the dummy circuit pad 362 and the distance between them may be changed in various ways, and a detailed description thereof will be made with reference to FIGS. 9 to 14.

As shown in FIG. 7, the display panel 100 according to an embodiment may include a substrate 110 and an insulating layer 120 located on the substrate 110.

The substrate 110 may be a rigid substrate or a flexible substrate capable of bending, folding, rolling, etc. In an embodiment, for example, the substrate 110 may include at least one of polyimide, polyamide, and polyethylene terephthalate. However, the material included in the substrate 110 is not limited thereto and may be changed in various ways.

The insulating layer 120 is located on the substrate 110 and may cover at least a part of the substrate 110. In an embodiment, as shown in FIG. 7, the insulating layer 120 may be defined by or composed of a single layer, but the embodiment is not limited to this and the insulating layer 120 may be defined by or composed of a plurality of layers.

The insulating layer 120 may include an inorganic insulating material such as silicon oxide, silicon nitride, silicon oxynitride, hafnium oxide, aluminum oxide, titanium oxide, tantalum oxide, or zinc oxide. However, the material included in the insulating layer 120 is not limited thereto and may be varied.

A plurality of panel pads 261 and a plurality of dummy panel pads 262 may be located on the insulating layer 120. In an embodiment, as shown in FIG. 7, the plurality of panel pads 261 and the plurality of dummy panel pads 262 may be defined by or configured of a single layer, but is not limited thereto, and the panel pads 261 and dummy panel pads 262 may be configured in multiple layers. In another embodiment, for example, each of the panel pad 261 and the dummy panel pad 262 may be defined by or composed of a plurality of conductive material layers.

The display device 10 according to an embodiment may further include an anisotropic conductive film ACF 400 located between the display panel 100 and the printed circuit board 30.

The anisotropic conductive film 400 may be located between the first pad area PA1 and the driving circuit chip 20 and between the second pad area PA2 and the printed circuit board 30 of the display panel 100.

In an embodiment, as shown in FIG. 7, the anisotropic conductive film 400 may be located between the panel pad 261 located in the second pad area PA2 and the circuit pad 361, and between the dummy panel pad 262 and the dummy circuit pad 362.

The anisotropic conductive film 400 may include an insulating resin 410 and a plurality of conductive balls 420 dispersed in the insulating resin 410.

The plurality of conductive balls 420 are located between the panel pad 261 and the circuit pad 361 and may contact each of the panel pad 261 and the circuit pad 361. The panel pad 261 and the circuit pad 361 may be electrically connected through the plurality of conductive balls 420.

In an embodiment, a plurality of conductive balls 420 may be located between the dummy panel pad 262 and the dummy circuit pad 362. The plurality of conductive balls 420 may contact each of the dummy panel pad 262 and the dummy circuit pad 362. However, the arrangement of the plurality of conductive balls 420 is not limited thereto and may be varied. In another embodiment, for example, the plurality of conductive balls 420 may be located between the panel pad 261 and the circuit pad 361, but may not be located between the dummy panel pad 262 and the dummy circuit pad 362.

The touch sensor 200 may be located on the display panel 100. In an embodiment, an anti-reflection layer (not shown) that can reduce reflection of external light may be further located on the touch sensor 200. The anti-reflection layer may include or be made of a polarizing layer including a linear polarizer, a retardation plate, etc. In an embodiment, a cover window (not shown) may be further located above the touch sensor 200. The cover window may serve to protect the touch sensor 200 and the display panel 100 located below it.

The touch sensor 200 may include a touch sensing area TA and a peripheral area NA. The touch sensing area TA of the touch sensor 200 may be located to correspond to (e.g., to overlap or cover) the display area DA of the display panel 100, and the peripheral area NA of the touch sensor 200 may be located to correspond to the peripheral area NA of the display panel 100. However, this is an example, and the touch sensing area TA may not match the display area DA. In another embodiment, for example, the touch sensing area TA may be narrower or wider than the display area DA.

The touch sensor 200 may detect contact with an external object, such as a finger or a pen, occurring within the touch sensing area TA. The touch sensor 200 may detect not only when an external object is in direct contact, but also when the external object is hovering nearby or approaching.

The touch sensor 200 may be located on an outer surface of the display panel 100 (on-cell type) or on the inner side (in-cell type). Additionally, the touch sensor 200 may be formed on a separate panel and attached to the display panel 100 (add-on type). Hereinafter, for convenience of description, embodiments where the touch sensor 200 is located on the outer surface of the display panel 100 will be described. However, embodiments are not limited thereto, and the position of the touch sensor 200 may be varied.

In an embodiment, as show in FIGS. 2 to 4, the touch sensor 200 may include a touch sensing electrode 240 located in the touch sensing area TA and a touch connection wire 250 connected to the touch sensing electrode 240. However, the embodiment is not limited thereto, and the touch sensing electrode 240 may be located to extend to the peripheral area NA. In such an embodiment, the touch sensing electrode may function as a manipulation unit to control the display device.

The touch sensing electrode 240 may include a first touch sensing electrode 241 extending along the first direction X, and a second touch sensing electrode 242 extending along the second direction Y that intersects with the first direction X.

The first touch sensing electrode 241 may include a plurality of first sensing cells 241a arranged along the first direction X, and a plurality of first connectors 241b that extend along the first direction X and that connect the plurality of first sensing cells 241a.

The first touch sensing electrode 241 may be a transmitter touch electrode (Tx touch electrode) through which a first touch signal for detecting coordinate values in the second direction Y is transmitted. The first sensing cell 241a may have a roughly diamond (or rhombus) shape. However, this is an example, and the shape of the first sensing cell 241a may be varied. In an embodiment, for example, the first sensing cell 241a may be formed in a polygonal shape such as a hexagon, circle, oval, or the like. The first sensing cell 241a may be formed in a mesh shape. That is, the first sensing cell 241a may be arranged in a way such that a plurality of conductive fine lines intersect to form a net shape. Additionally, the first sensing cell 241a may have various shapes, such as protrusions to improve the sensitivity of the touch sensor.

The second touch sensing electrode 242 may include a plurality of second sensing cells 242a arranged along the second direction Y, and a plurality of second connectors 242b that extend along the second direction Y and connect the plurality of second sensing cells 242a. The second touch sensing electrode 242 may be a receiver touch electrode (Rx touch electrode) through which a second touch signal for detecting coordinate values in the first direction X is transmitted. The second sensing cell 242a may have a roughly diamond (or rhombus) shape. However, this is one example, and the shape of the second sensing cell 242a may be varied. In another embodiment, for example, the second sensing cell 242a may be formed in a polygonal shape such as a hexagon, circle, oval, or the like. The second sensing cell 242a may be formed in a mesh shape. That is, the second sensing cell 242a may be arranged in a way such that a plurality of conductive fine lines intersect to form a net shape. Additionally, the second sensing cell 242a may have various shapes, such as protrusions to improve the sensitivity of the touch sensor.

The first touch sensing electrode 241 and the second touch sensing electrode 242 may be located in different layers from each other. In a plan view, the first sensing cell 241a and the second sensing cell 242a are adjacent to each other, and the first connecting part 241b and the second connecting part 242b overlap each other but may be insulated from each other by an insulating layer. That is, an insulating layer may be located between the first touch sensing electrode 241 and the second touch sensing electrode 242. However, this is an example, and the first touch sensing electrode 241 and the second touch sensing electrode 242 may be located at least partially in (or directly on) a same layer as each other. In an embodiment, for example, the first sensing cell 241a and the second sensing cell 242a may be located in (or directly on) a same layer as each other. In such an embodiment, one of the first connection part 241b and the second connection part 242b may be located in (or directly on) the same layer as the first sensing cell 241a and the second sensing cell 242a, and the other of the first connection part 241b and the second connection part 242b may be located in (or directly on) a different layer on which the first sensing cell 241a and the second sensing cell 242a are located. In an embodiment, for example, the first connection part 241b may be located in (or directly on) a different layer from the first sensing cell 241a and the second sensing cell 242a, and the second connection part 241b may be located in (or directly on) a same layer as the one on which the first sensing cell 241a and the second sensing cell 242a are located. An insulating layer may be located between the second connection part 241b and the second sensing cell 242a, and the second connecting part 241b and the second sensing cell 242a may be connected to each other through a contact hole defined or formed in the insulating layer.

The touch sensing electrode 240 may include at least one selected from low-resistance metals such as silver (Ag), aluminum (Al), copper (Cu), chromium (Cr), and nickel (Ni), or may include at least one selected from conductive nanomaterials such as silver nanowire, carbon nanotube, or the like. Additionally, the touch sensing electrode 240 may include a transparent metal oxide such as indium tin oxide (ITO), indium zinc oxide (IZO), or the like. Additionally, the touch sensing electrode 240 may include or be made of a plurality of layers including titanium (Ti)/aluminum (Al)/titanium (Ti). In such an embodiment, the touch sensing electrode 240 may have low resistance, which can reduce RC delay, and have high ductility, such the touch sensing electrode 240 may not easily crack even when subjected to repeated deformation such as bending.

The first touch sensing electrode 241 and the second touch sensing electrode 242 that are adjacent to each other may form a mutual capacitor that functions as a touch sensor. The mutual capacitor can receive a driving signal through either the first touch sensing electrode 241 or the second touch sensing electrode 242 and can output the change in charge amount caused by the touch of an external object as an output signal through the remaining touch electrode.

Alternatively, the plurality of first touch sensing electrodes 241 may be separated from each other and the plurality of second touch sensing electrodes 242 may also be separated from each other to form independent touch electrodes. In such an embodiment, each touch sensing electrode may act as a touch sensor and form a self-capacitor. A magnetic capacitor may receive a driving signal and be charged with a predetermined amount of charge, and when there is a touch thereon, the amount of charge changes and an output signal different from the input driving signal may be output.

The touch connection wire 250 may include a plurality of first touch connection wires 251 connected to a plurality of first touch sensing electrodes 241 and a plurality of second touch connection wires 252 connected to the second touch sensing electrode 242.

Some of the plurality of second touch connection wires 252 may be connected to the upper end of the second touch sensing electrode 242, and the remainder may be connected to the lower end of the second touch sensing electrode 242.

In an embodiment, the plurality of first touch connection wires 251 and the plurality of second touch connection wires 252 may extend from the touch sensing area TA of the touch sensor 200 through the peripheral area NA of the touch sensor 200, the first pad area PA1 of the display panel 100, and the second pad area PA2 of the display panel 100, to reach one edge of the peripheral area NA.

In an embodiment, as shown in FIG. 4, the plurality of first touch connection wires 251 and the plurality of second touch connection wires 252 overlap the driving circuit chip 20 attached to the first pad area PA1 of the display panel 100 in a plan view or when viewed in the third direction Z, and may be electrically connected to the driving circuit chip 20. In an embodiment, for example, the plurality of first touch connection wires 251 and the plurality of second touch connection wires 252 are connected to a plurality of touch signal wire pads located in the first pad area PA1, and the plurality of bumps of the driving circuit chip 20 may be electrically connected to the plurality of touch signal wiring pads. However, this is merely an example, and the connection relationships between the plurality of first touch connection wires 251 and the plurality of second touch connection wires 252 and the driving circuit chip 20 may be variously modified.

In an embodiment, the first touch connection wire 251 and the second touch connection wire 252 may extend between a plurality of dummy panel pads 262 located in the second pad area PA2 of the display panel 100. That is, the dummy panel pads 262 may be located on both opposing sides of the first touch connection wire 251 and the second touch connection wire 252 in a plan view. In such an embodiment, each of the first touch connection wire 251 and the second touch connection wire 252 may be located between the dummy panel pads 262 located adjacent to each other.

In an embodiment, the first touch connection wire 251 may be located between a plurality of dummy panel pads 262 located adjacent to one side edge of the second pad area PA2, and the second touch connection wire 252 may be located between a plurality of dummy panel pads 262 located adjacent to the other side edge of the second pad area PA2.

In an embodiment, a plurality of touch connection wires 250 may be located between dummy panel pads 262 located adjacent to each other in a plan view. In an embodiment, for example, at least two touch connection wires 250 may be located between dummy panel pads 262 located adjacent to each other. However, the number of touch connection wires 250 located between the dummy panel pads 262 located adjacent to each other is not limited to this and may be varied. In another embodiment, for example, only one touch connection wire 250 may be located between dummy panel pads 262 located adjacent to each other.

In an embodiment, the touch connection wire 250 located between the dummy panel pads 262 adjacent to each other in the second pad area PA2 of the display panel 100 may be connected to a test pad to test the characteristics of the touch sensor 200, in a process of cutting a part of the display panel 100, the part may be removed along with the test pad. That is, the touch connection wire 250 located between the dummy panel pads 262 that are adjacent to each other may correspond to the remaining wiring part, where a part of the touch connection wire 250 connected to the test pad is removed during the process of cutting part of the display panel 100. In such an embodiment, the touch connection wire 250 located between the dummy panel pads 262 in the second pad area PA2 may be a wiring part for testing the characteristics of the touch sensor 200.

In an embodiment, as described above, the touch connection wire 250 located between adjacent dummy panel pads 262 corresponds to the remaining wiring part after the process of cutting part of the display panel 100, therefore, the ends of the touch connection wire 250 extended between adjacent dummy panel pads 262 may be aligned substantially at a same boundary as the corresponding end of the peripheral area NA of the display panel 100. That is, the ends of the plurality of touch connection wires 250 extending between the dummy panel pads 262 that are adjacent to each other may be aligned with the lower end of the peripheral area NA of the display panel 100 in a plan view. In such an embodiment, one end of the touch connection wire 250 may be connected to the touch sensing electrode 240, and the other end of the touch connection wire 250 may be floating.

In an embodiment, the touch connection wire 250 may include a first wiring part located in the peripheral area NA of the touch sensor 200 and a second wiring part that extends to the edge of the peripheral area NA of the display panel 100 through the bending area BA, the first pad area PA1, and the second pad area PA2 of the display panel 100. The same touch signal may be applied to the first and second wiring parts of the touch connection wire 250.

The first and second wiring parts of the touch connection wire 250 may be formed integrally with each as a single unitary indivisible body. However, the embodiment is not limited thereto and may be varied. In another embodiment, for example, the first and second wiring parts of the touch connection wire 250 may be configured separately, located in (or directly on) different layers, and electrically connected to each other.

In another embodiment, for example, the touch connection wire 250 includes a first wiring part that connects the touch sensing electrode 240 with the driving circuit chip 20, and a second wiring part connected to the driving circuit chip 20 and extending between the dummy panel pads 262 that are adjacent to each other in the second pad area PA2, where the first wiring part and the second wiring part may be in separate configurations and electrically connected to each other.

In an embodiment, as shown in FIG. 7, the touch connection wire 250 located between the dummy panel pads 262 that are adjacent to each other may be located in (or directly on) a different layer from the dummy panel pads 262. The touch connection wire 250 located between the dummy panel pads 262 may be located on the substrate 110, and the dummy panel pads 262 may be located on the insulating layer 120. The touch connection wire 250 located between the dummy panel pads 262 may be entirely covered by the insulating layer 120. However, the embodiment is not limited thereto and may be varied. In another embodiment, for example, the dummy panel pads 262 and the touch connection wire 250 located between the dummy panel pads 262 may be located In (or directly on) a same layer as each other.

As the printed circuit board 30 is attached to the second pad area PA2 of the display panel 100, the touch connection wire 250 located between the dummy panel pads 262 may overlap the printed circuit board 30 in a thickness direction or in the third direction Z.

In an embodiment, the circuit pads 361 and the dummy circuit pads 362 of the printed circuit board 30 may not overlap the touch connection wire 250. In such an embodiment, as the dummy circuit pads 362 of the printed circuit board 30 are located to overlap the dummy panel pads 262 located in the second pad area PA2 of the display panel 100, the dummy circuit pads 362 may be located on both opposing sides of the touch connection wire 250.

According to an embodiment of the display device 10, the dummy panel pads 262 and the dummy circuit pads 362 of the printed circuit board 30 may be located on either side of the touch connection wire 250 that extends from the touch sensor 200 to the pad area of the display panel 100 to which the printed circuit board 30 is attached to ensure an alignment margin of the pads of the printed circuit board 30 that are bonded to each of the pads of the display panel.

Accordingly, it is possible to effectively prevent the occurrence of a short circuit between the touch connection wires 250 located between the pad of the printed circuit board 30 and the dummy panel pads 262.

Hereinafter, display devices according to various embodiments will be described with reference to FIGS. 8 to 14. In description of the following embodiments, the same components as those of the previously described embodiments will be referred to by the same reference numerals, any repetitive detailed descriptions will be omitted or simplified, and differences will be mainly described.

FIG. 8 to FIG. 14 are plan views showing parts of display devices according to some embodiments. Specifically, FIGS. 8 to 14 are enlarged view of areas P2 to P8 corresponding to area P1 in FIG. 3.

Figure 8:
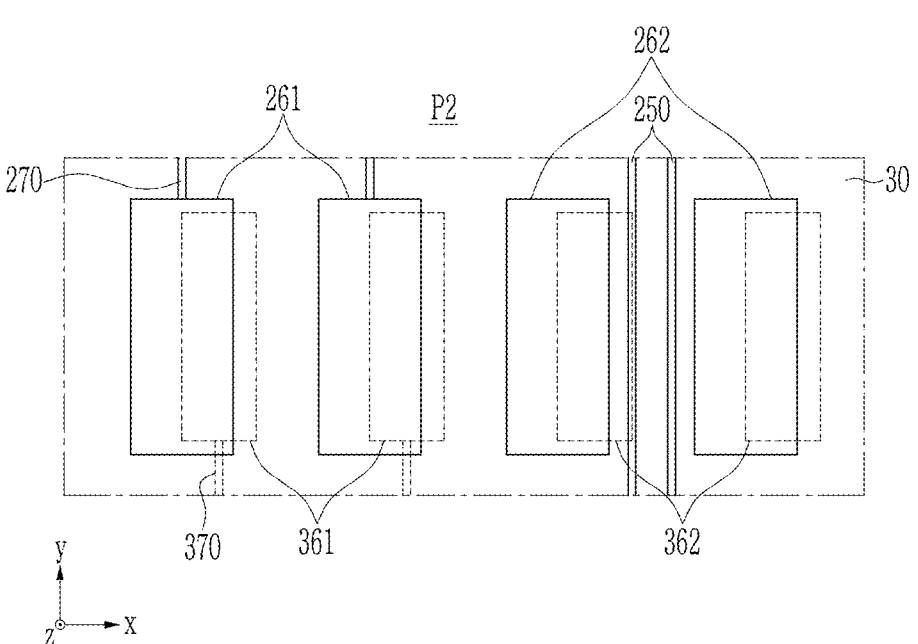
FIG. 8 to FIG. 14 are plan views showing parts of display devices according to some embodiments.

According to an embodiment, as shown in FIG. 8, the circuit pad 361 and the dummy circuit pad 362 of the printed circuit board 30 may be misaligned and bonded to the panel pad 261 and the dummy panel pad 262, respectively.

In such an embodiment, the circuit pad 361 and dummy circuit pad 362 of the printed circuit board 30 are arranged to completely overlap the panel pad 261 and the dummy panel pad 262, and the circuit pad 361 and the dummy circuit pad 362 of the printed circuit board 30 may be misaligned to partially overlap the panel pad 261 and the dummy panel pad 262.

In such an embodiment, as shown in FIG. 8, the circuit pad 361 of the printed circuit board 30 may overlap a part of the panel pad 261. A part of the circuit pad 361 may overlap the panel pad 261 in the thickness direction (or the third direction Z), and the remaining part of the circuit pad 361 may not overlap the panel pad 261 in the thickness direction.

The dummy circuit pad 362 of the printed circuit board 30 may overlap a part of the dummy panel pad 262. As the dummy circuit pads 362 of the printed circuit board 30 are shifted to partially overlap the dummy panel pads 262, some of the dummy circuit pads 362 overlap the dummy panel pads 262 in the thickness direction, and the remaining parts can overlap, in the thickness direction, any of the plurality of touch connection wires 250 located between the adjacent dummy panel pads 262.

According to this embodiment, it may have substantially the same effect as the display device 10 according to an embodiment. That is, even if the dummy circuit pad 362 of the printed circuit board 30 is misaligned to overlap one of the plurality of touch connection wires 250 located between the plurality of dummy panel pads 262, as the dummy panel pad 262 and the dummy circuit pad 362 are electrically floating, defects may be effectively prevented even if a short occurs between the dummy circuit pad 362 and the touch connection wire 250.

Figure 9:
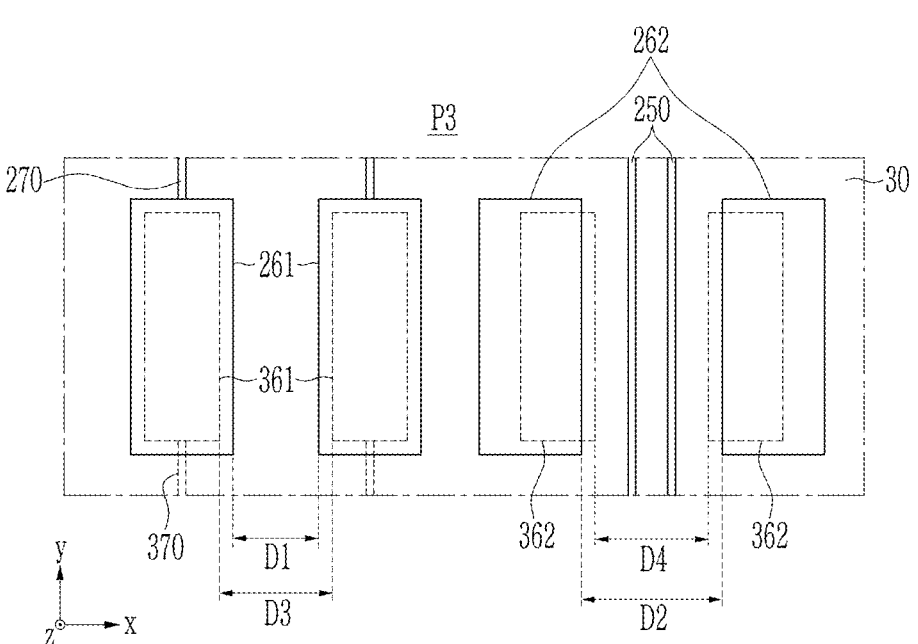
Figure 10:
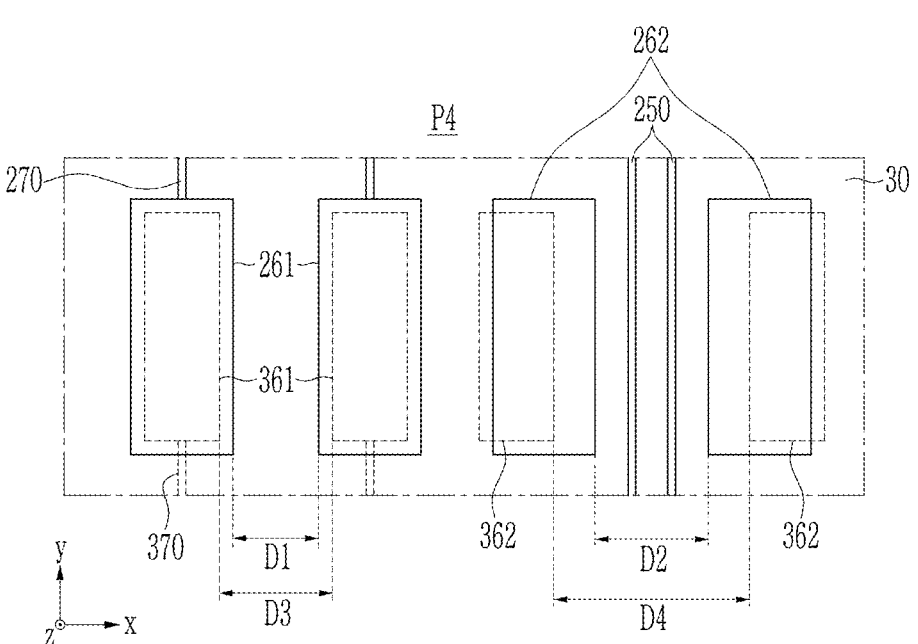
Figure 11:
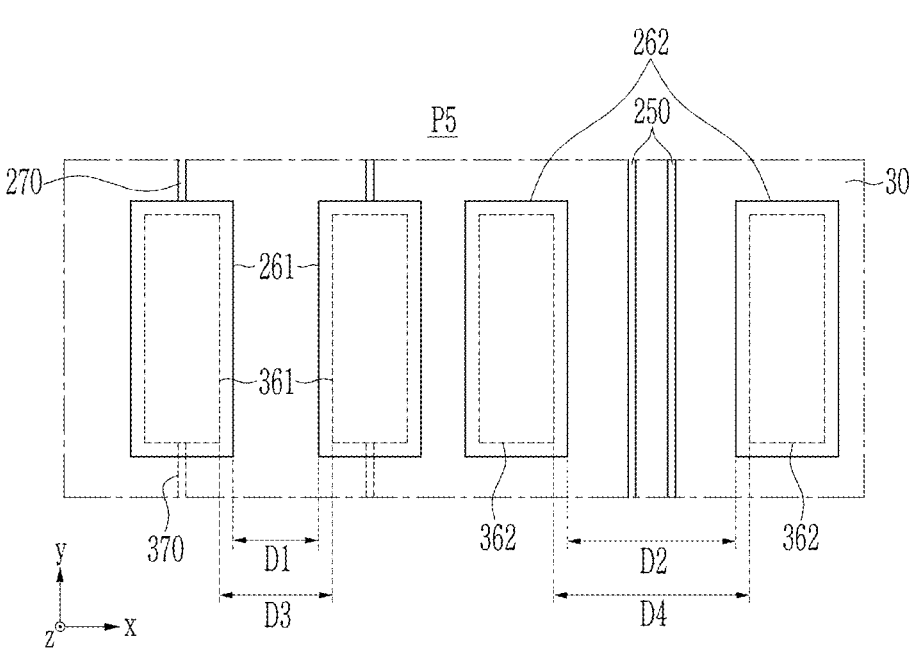

According to embodiments, as shown in FIGS. 9 to 11, the gap or spacing between adjacent dummy panel pads 262 and/or adjacent dummy circuit pads 362 may be variously modified.

In embodiments according to FIGS. 9 to 11, the width of the panel pad 261 in the first direction X may be substantially the same as the width of the dummy panel pad 262 in the first direction X, and the width of the circuit pad 361 in the first direction X may be substantially the same as the width of the dummy circuit pad 362 in the first direction X.

Referring to FIGS. 9 to 11, the panel pads 261 that are adjacent to each other are spaced apart by a first distance D1 along the first direction X, and the dummy panel pads 262 that are adjacent to each other can be spaced apart by a second distance D2 along the first direction X.

Here, the first distance D1 and the second distance D2 may each refer to the distance along the first direction X between one side and the other of the panel pads 261 that are adjacent to each other, and the distance along the first direction X between one side and the other of the dummy panel pads 262 that are facing each other.

The circuit pads 361 that are adjacent to each other may be spaced apart by a third distance D3 along the first direction X, and the dummy circuit pads 362 that are adjacent to each other may be spaced apart by a fourth distance D4 along the first direction X.

Here, the third distance D3 and the fourth distance D4 can each refer to the distance in the first direction X between two facing sides of two adjacent circuit pads 361, and the distance in the first direction X between two facing sides of two adjacent dummy circuit pads 362, respectively.

According to an embodiment, as shown in FIG. 9, the panel pads 261 and the dummy panel pads 262 may be arranged in a way such that the spacing between the dummy panel pads 262 that are adjacent to each other is wider than the spacing between the panel pads 261 that are adjacent to each other, and the circuit pads 361 and dummy circuit pads 362 may be arranged in a way such that the spacing between adjacent circuit pads 361 and the spacing between the dummy circuit pads 362 that that are adjacent to each other are substantially the same as each other. That is, the first distance D1 may be smaller than the second distance D2, and the third distance D3 may be substantially equal to the fourth distance D4. In such an embodiment, the second distance D2 may be greater than the fourth distance D4.

In such an embodiment, by arranging the panel pads 261 and the dummy panel pads 262 in a way such that the spacing between the panel pads 261 that are adjacent to each other is different from the spacing between the dummy panel pads 262 that are adjacent to each other, the dummy circuit pads 362 of the printed circuit board 30 may be located to overlap a part of the dummy panel pads 262 in the thickness direction.

According to an embodiment, as the distance between the dummy panel pads 262 that are adjacent to each other increases, it is possible to vary the spacing between the touch connection wires 250 located between the dummy panel pads 262 that are adjacent to each other or the number of touch connection wires 250 therebetween.

Accordingly, such an embodiment may have substantially the same effect or desired characteristics as the embodiments described above. In addition, the number and arrangement of the dummy panel pads 262 located in the area where the printed circuit board 30 is attached may be varied.

According to an embodiment, as shown in FIG. 10, the circuit pads 361 and the dummy circuit pads 362 may be arranged in a way such that the spacing between the dummy circuit pads 362 that are adjacent to each other is wider than the spacing between the circuit pads 361 that are adjacent to each other, and the panel pads 261 and the dummy panel pads 262 can be arranged in a way such that that the spacing between the panel pads 261 that are adjacent to each other and the spacing between the dummy panel pads 262 that are adjacent to each other are substantially the same as each other. That is, the first distance D1 may be substantially equal to the second distance D2, and the third distance D3 may be smaller than the fourth distance D4. Additionally, the second distance D2 may be smaller than the fourth distance D4.

In such an embodiment, by arranging the circuit pads 361 and the dummy circuit pads 362 in a way such that the spacing between the circuit pads 361 that are adjacent to each other and the spacing between the dummy circuit pads 362 that are adjacent to each other are different, the dummy circuit pads 362 of the printed circuit board 30 may be located to overlap a part of the dummy panel pads 262 in the thickness direction.

According to an embodiment, as the gap between the dummy circuit pads 362 that are adjacent to each other is widened, an alignment margin between the dummy circuit pads 362 and the dummy panel pads 262 of the printed circuit board 30 is additionally secured.

According to an embodiment, as shown in FIG. 11, the panel pad 261 and the dummy panel pad 262 may be arranged in a way such that the gap between the dummy panel pads 262 that are adjacent to each other is wider than the gap between the panel pads 261 that are adjacent to each other, and the panel pad 261 and the dummy panel pad 262 may be arranged in a way such that the gap between the dummy circuit pads 362 that are adjacent to each other is wider than the gap between the circuit pads 361 that are adjacent to each other. That is, the first distance D1 may be smaller than the second distance D2, and the third distance D3 may be smaller than the fourth distance D4. In such an embodiment, the second distance D2 may be smaller than the fourth distance D4.

According to an embodiment, the dummy circuit pad 362 of the printed circuit board 30 may be arranged to completely overlap the dummy panel pad 262 in the thickness direction. However, the embodiment is not limited to this, and the dummy circuit pads 362 may be arranged to overlap a part of the dummy panel pads 262 in the thickness direction.

In such an embodiment, it is possible to have substantially the same effect or desired characteristics as the embodiments described above with reference to FIGS. 9 and 10.

Figure 12:
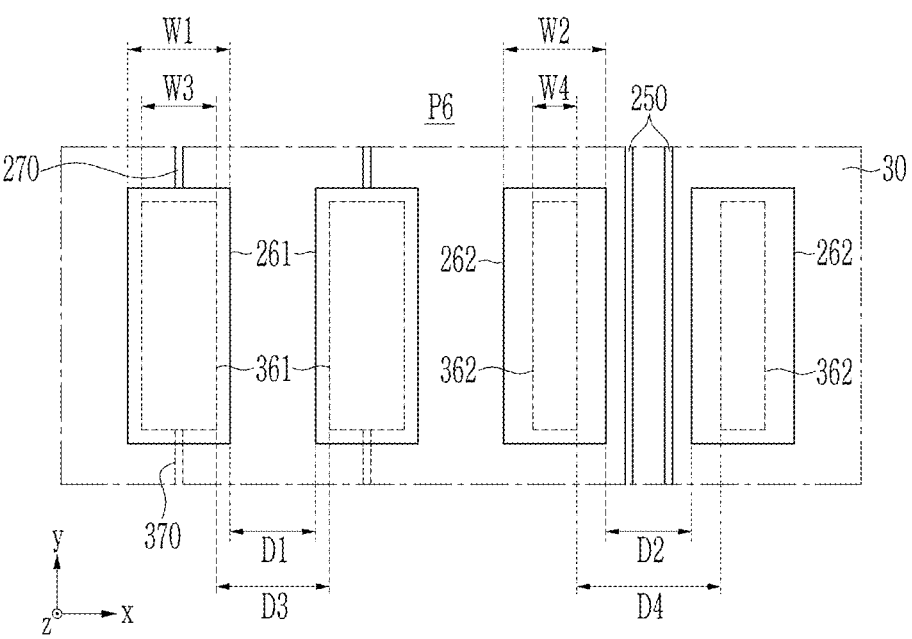
Figure 13:
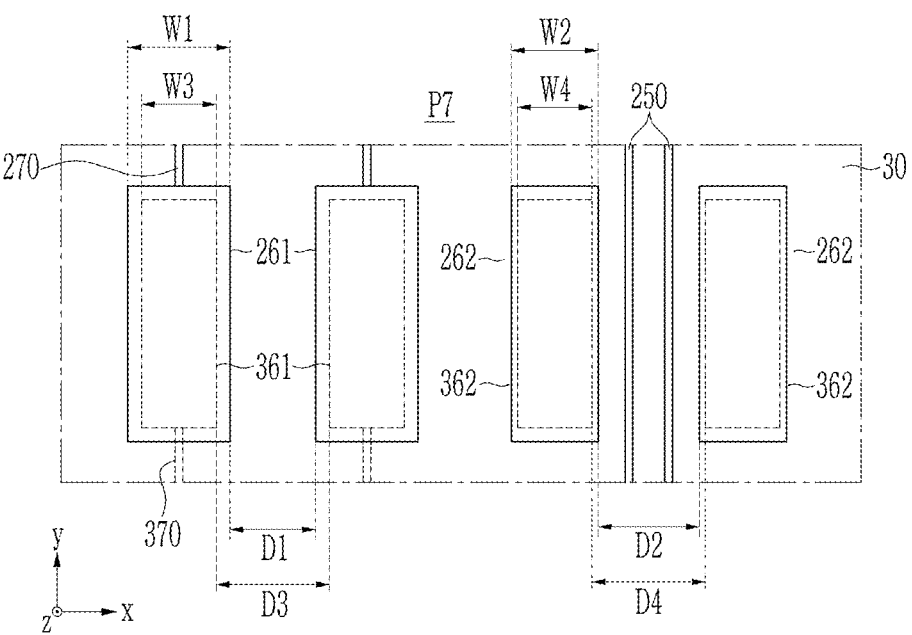
Figure 14:
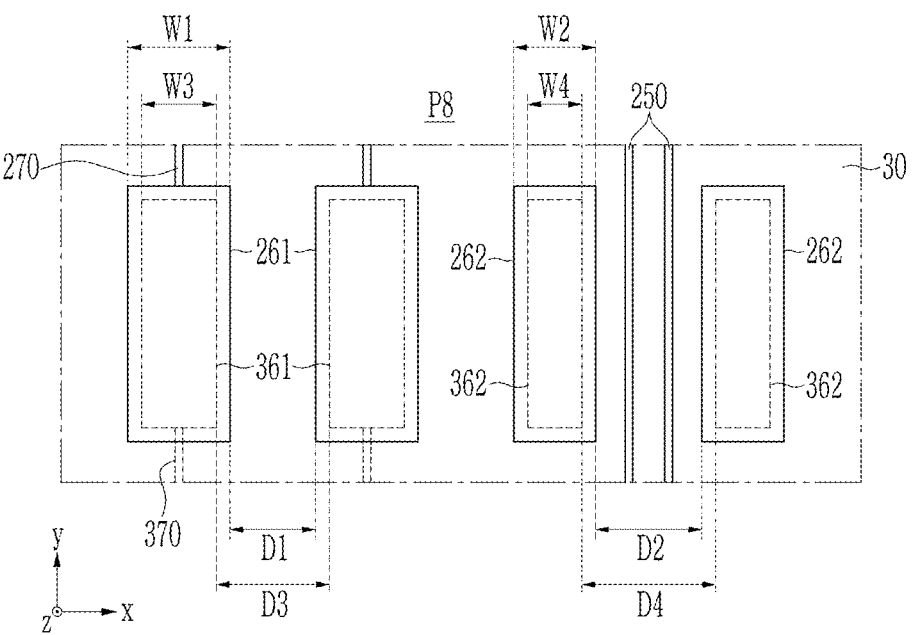

According to embodiments, as shown in FIGS. 12 to 14, the width of the dummy panel pads 262 and/or the width of the dummy circuit pads 362 may be modified.

In embodiments, as shown in FIGS. 12 to 14, the panel pad 261 may have a first width W1 in the first direction X, and the dummy panel pad 262 may have a second width W2 in the first direction X.

The circuit pad 361 of the printed circuit board 30 that overlaps the panel pad 261 has a third width W3 in the first direction X, and the dummy circuit pad 362 that overlaps the dummy panel pad 262 can have a fourth width W4 in the first direction X.

The panel pads 261 that are adjacent to each other are spaced apart by the first distance D1 in the first direction X, and the dummy panel pads 262 that are adjacent to each other may be spaced apart by the second distance D2 in the first direction X.

Additionally, the circuit pads 361 that are adjacent to each other may be spaced apart by the third distance D3 in the first direction X, and the dummy circuit pads 362 that are adjacent to each other can be spaced apart by the fourth distance D4 in the first direction X.

According to an embodiment, as shown in FIG. 12, the width of the panel pad 261 is substantially the same as the width of the dummy panel pad 262, and the width of the circuit pad 361 is greater than the width of the dummy circuit pad 362. That is, the first width W1 may be substantially equal to the second width W2, and the third width W3 may be larger than the fourth width W4. Additionally, the first width W1 may be larger than the third width W3, and the second width W2 may be larger than the fourth width W4.

In such an embodiment, as the width of the circuit pad 361 is greater than the width of the dummy circuit pad 362, the space between the circuit pads 361 that are adjacent to each other can be smaller than the space between the dummy circuit pads 362 that are adjacent to each other. That is, the third distance D3 may be smaller than the fourth distance D4.

In such an embodiment, since the width of the panel pad 261 is substantially the same as the width of the dummy panel pad 262, the spacing between the panel pads 261 that are adjacent to each other can be substantially the same as the spacing between the dummy panel pads 262 that are adjacent to each other. That is, the first distance D1 may be substantially equal to the second distance D2.

In such an embodiment, the ratio between the fourth width W4 and the fourth distance D4 may be in a range of about 1:1 to about 1:1.5. In an embodiment, for example, the ratio between the fourth width W4 and the fourth distance D4 may be about 1:3. In another embodiment, for example, the ratio between the fourth width W4 and the fourth distance D4 may be about 1:5. However, the ratio between the fourth width W4 and the fourth distance D4 is not limited to this and may be varied.

In such an embodiment, the ratio of the fourth width W4 to the fourth distance D4 is in the numerical range described above, such that an alignment margin may be obtained that can prevent shorting or the like from occurring between the dummy circuit pads 362 of the printed circuit board 30 and the touch connection wire 250 located between the dummy panel pads 262 that are adjacent to each other of the printed circuit board 30.

Such embodiments can have substantially the same effect or desired characteristics as that described above with reference to FIG. 10.

According to an embodiment, as shown in FIG. 13, the width of the panel pad 261 is greater than the width of the dummy panel pad 262, and the width of the circuit pad 361 is substantially the same as the width of the dummy circuit pad 362.

In such an embodiment, the width of the dummy panel pad 262 may be larger than the width of the dummy circuit pad 362. That is, the first width W1 may be larger than the second width W2, and the third width W3 may be substantially equal to the fourth width W4. In such an embodiment, the first width W1 may be larger than the third width W3, and the second width W2 may be larger than the fourth width W4.

In such an embodiment, as the width of the panel pad 261 is greater than the width of the dummy panel pad 262, the gap between the panel pads 261 that are adjacent to each other can be smaller than the gap between the dummy panel pads 262 that are adjacent to each other. That is, the first distance D1 may be smaller than the second distance D2.

In such an embodiment, since the width of the panel pad 261 is substantially the same as the width of the dummy panel pad 262, the spacing between the panel pads 261 that are adjacent to each other can be substantially the same as the spacing between the dummy panel pads 262 that are adjacent to each other. That is, the third distance D3 may be substantially equal to the fourth distance D4.

In such an embodiment, the dummy circuit pad 362 may be arranged to completely overlap the dummy panel pad 262 in the thickness direction. In such an embodiment, as the width of the dummy circuit pad 362 is smaller than the width of the circuit pad 361, even if the circuit pad 361 is misaligned and bonded to the panel pad 261, the dummy circuit pad 362 may be arranged to completely overlap the dummy panel pad 262 in the thickness direction.

Such an embodiment can have substantially the same effect or desired characteristics as that described above with reference to FIG. 9.

According to an embodiment, as shown in FIG. 14, the width of the panel pad 261 may be greater than the width of the dummy panel pad 262, and the width of the circuit pad 361 may be greater than the width of the dummy circuit pad 362.

In such an embodiment, the width of the dummy panel pad 262 may be larger than the width of the dummy circuit pad 362. That is, the first width W1 may be larger than the second width W2, and the third width W3 may be larger than the fourth width W4. In such an embodiment, the first width W1 may be larger than the third width W3, and the second width W2 may be larger than the fourth width W4.

In such an embodiment, as the width of the panel pad 261 is greater than the width of the dummy panel pad 262, the space between the panel pads 261 that are adjacent to each other can be smaller than the space between the dummy panel pads 262 that are adjacent to each other. That is, the first distance D1 may be smaller than the second distance D2.

In such an embodiment, as the width of the circuit pad 361 is larger than the width of the dummy circuit pad 362, the gap between the circuit pads 361 that are adjacent to each other becomes smaller than the gap between the dummy circuit pads 362 that are adjacent to each other. That is, the third distance D3 may be smaller than the fourth distance D4.

Such an embodiment can have substantially the same effect or desired characteristics as that described above with reference to FIG. 11.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:
a display panel including a display area and a peripheral area defined around the display area;
a touch sensor including a touch sensing electrode disposed on the display panel and overlapping the display area of the display panel;
a plurality of panel pads disposed on the peripheral area of the display panel;
a plurality of dummy panel pads disposed on the peripheral area of the display panel and spaced apart from the plurality of panel pads, wherein the plurality of dummy panel pads includes two adjacent dummy panel pads located between the plurality of panel pads;
a driving circuit chip disposed between the display area and the plurality of panel pads, and between the display area and the plurality of dummy panel pads; and
a touch connection wire connected to the touch sensing electrode and the driving circuit chip,
wherein the touch connection wire is disposed between the plurality of dummy panel pads in a plan view.

2. The display device of claim 1, wherein
the touch connection wire is provided in plural, and
a plurality of touch connection wires is disposed between adjacent dummy panel pads among the plurality of dummy panel pads.

3. The display device of claim 1, wherein
a width of the plurality of panel pads is greater than a width of the plurality of dummy panel pads.

4. The display device of claim 1, wherein
a distance between adjacent panel pads among the plurality of panel pads is smaller than a distance between adjacent dummy panel pads among the plurality of dummy panel pads.

5. The display device of claim 1, wherein
the plurality of panel pads and the plurality of dummy panel pads are arranged in a row to be adjacent to the driving circuit chip.

6. The display device of claim 1, wherein
one end of the touch connection wire is connected to the touch sensing electrode, and
an opposing end of the touch connection wire is substantially aligned with a same boundary as an end of the display panel which is adjacent to the plurality of panel pads and the plurality of dummy panel pads in the plan view.

7. The display device of claim 1, wherein
the touch connection wiring overlaps the driving circuit chip in the plan view.

8. The display device of claim 1, wherein
the plurality of dummy panel pads are floating.

9. A display device, comprising:
a display panel including a display area and a peripheral area defined around the display area;
a touch sensor including a touch sensing electrode on the display panel and overlapping the display area of the display panel;
a plurality of panel pads disposed on the peripheral area of the display panel;
a plurality of dummy panel pads spaced apart from the plurality of panel pads, wherein the plurality of dummy panel pads includes two adjacent dummy panel pads located between the plurality of panel pads;
a driving circuit chip disposed between the display area and the plurality of panel pads and between the display area and the plurality of dummy panel pads;
a touch connection wire connected to the touch sensing electrode and the driving circuit chip;
a printed circuit board overlapping the plurality of panel pads and the plurality of dummy panel pads;
a plurality of circuit pads disposed on the printed circuit board to face the plurality of panel pads; and
a plurality of dummy circuit pads disposed on the printed circuit board to face the plurality of dummy panel pads,
wherein the touch connection wire is disposed between the plurality of dummy panel pads in a plan view.

10. The display device of claim 9, wherein
a width of the plurality of dummy panel pads is greater than a width of the plurality of dummy circuit pads.

11. The display device of claim 9, wherein
the touch connection wire is provided in plural, and
a plurality of touch connection wires is disposed between adjacent dummy panel pads among the plurality of dummy panel pads.

12. The display device of claim 11, wherein
the plurality of dummy circuit pads overlaps a part of a dummy panel pad of the plurality of dummy panel pads in the plan view.

13. The display device of claim 12, wherein
the plurality of dummy circuit pads overlaps one of the plurality of touch connection wires disposed between adjacent dummy panel pads among the plurality of dummy panel pads.

14. The display device of claim 9, wherein
a width of the plurality of circuit pads is greater than a width of the plurality of dummy circuit pads.

15. The display device of claim 14, wherein
a width of the plurality of panel pads is greater than a
width of the plurality of dummy panel pads.

16. The display device of claim 9, wherein
a distance between adjacent circuit pads among the plurality of circuit pads is smaller than a distance between
adjacent dummy circuit pads among the plurality of
dummy circuit pads.

17. The display device of claim 16, wherein
a distance between adjacent panel pads among the plurality of panel pads is smaller than a distance between
adjacent dummy panel pads among the plurality of
dummy panel pads.

18. The display device of claim 9, wherein
a ratio of a width of each of the plurality of dummy circuit
pads and a distance between adjacent dummy circuit
pads among the plurality of dummy circuit pads is in a
range of about 1:1 to 1:1.5.

19. The display device of claim 9, wherein
the plurality of dummy panel pads and the plurality of
dummy circuit pads are floating.

20. The display device of claim 9, further comprising:
a conductive ball disposed between the plurality of panel
pads and the plurality of circuit pads and between the
plurality of dummy panel pads and the plurality of
dummy circuit pads.

\* \* \* \* \*